(12) United States Patent
Apps

(10) Patent No.: US 10,000,326 B2
(45) Date of Patent: Jun. 19, 2018

(54) PLASTIC BEER KEG

(71) Applicant: Rehrig Pacific Company, Los Angeles, CA (US)

(72) Inventor: William P. Apps, Alpharetta, GA (US)

(73) Assignee: Rehrig Pacific Company, Los Angeles, CA (US)

(*) Notice: Subject to any disclaimer, the term of this patent is extended or adjusted under 35 U.S.C. 154(b) by 0 days. days.

(21) Appl. No.: 15/256,661

(22) Filed: Sep. 5, 2016

(65) Prior Publication Data

US 2017/0129682 A1    May 11, 2017

Related U.S. Application Data

(63) Continuation of application No. 12/693,831, filed on Jan. 26, 2010, now Pat. No. 9,434,505.

(51) Int. Cl.
*B65D 77/04* (2006.01)
*B65D 8/02* (2006.01)
*B67D 1/08* (2006.01)
*B67D 1/00* (2006.01)

(52) U.S. Cl.
CPC .......... *B65D 77/0486* (2013.01); *B65D 11/08* (2013.01); *B67D 1/0804* (2013.01); *B67D 1/0835* (2013.01); *B67D 2001/0093* (2013.01); *B67D 2001/0824* (2013.01)

(58) Field of Classification Search
CPC .. B65D 77/0486; B65D 11/08; B67D 1/0835; B67D 1/0804; B67D 2001/0824; B67D 2001/0093

USPC .......................................... 222/131, 105, 566
See application file for complete search history.

(56) References Cited

U.S. PATENT DOCUMENTS

| | | | | |
|---|---|---|---|---|
| 4,531,656 A * | 7/1985 | Nitchman | .............. | B65D 77/06 215/12.1 |
| 5,222,620 A * | 6/1993 | Lima | ...................... | B65D 25/16 220/495.08 |
| 5,238,150 A * | 8/1993 | Williams | .............. | B05B 9/0838 222/105 |
| 5,597,085 A * | 1/1997 | Rauworth | .............. | B65D 11/06 220/23.83 |
| 6,666,358 B1 * | 12/2003 | Field | ...................... | B65D 11/06 222/400.7 |

FOREIGN PATENT DOCUMENTS

WO    WO 2008013819 A2 *    1/2008    ......... B65D 21/0231

* cited by examiner

*Primary Examiner* — Donnell Long
(74) *Attorney, Agent, or Firm* — Carlson, Gaskey & Olds PC

(57) ABSTRACT

A plastic beer keg includes an outer container and a liner having a neck portion and a body portion. A removable lid is secured over an opening of the container to enclose the liner. A locking ring secures the neck portion to the lid. The neck optionally includes a neck ring which interlocks with the opening through the lid to prevent relative rotation therebetween. The locking ring optionally includes ratcheting teeth engaging ratchet teeth on the lid to prevent inadvertent loosening of the locking ring. The liner may be suspended from the lid by the neck when empty.

9 Claims, 18 Drawing Sheets

PLASTIC BEER KEG

BACKGROUND OF THE INVENTION

The present invention relates to a plastic container for liquids, particularly beverages such as beer.

Most current beer kegs include a steel body with a valve in the top for both filling the keg and for accessing the contents. The steel kegs are reusable. Empty kegs are returned and then washed and refilled in an automated process. The steel kegs are inverted, such that the valve is at the bottom of the keg to facilitate draining during cleaning. The interior of the body of the keg is washed by spraying cleansing liquids through the valve. The cleansing liquids wash the inner surface of the body of the keg and then drain downward through the valve. The kegs are typically then filled in the inverted position through the valve at the bottom of the keg. Throughout the automated process, a cylinder clamps the body of the keg with a high force (between 200 and 300 lb.) to hold the keg in place while the washing and filling heads connect to the valve at the bottom of the keg.

There are several problems with the use of steel kegs. First, they are fairly heavy, even when empty. Second, they are expensive and are not always returned by the user. If a deposit is charged to the user to ensure the return of the keg, this may discourage the user from choosing to purchase beer by the keg in the first place. However, if the deposit is too low, it is possible that the value of the steel in the keg exceeds the amount of the deposit, thus contributing to some kegs not being returned.

SUMMARY OF THE INVENTION

The present invention provides a plastic keg with various optional desirable features. In the disclosed embodiment, the plastic keg includes a container with an outer wall defining a container interior. A plastic liner is received in the container and includes a neck portion. A retainer of a valve assembly secures the valve assembly to the neck of the liner. A locking ring secures the neck of the liner to the lid via the retainer.

The neck optionally includes a neck ring which interlocks with the opening through the lid to prevent relative rotation therebetween. The locking ring optionally includes ratcheting teeth engaging ratchet teeth on the lid to prevent inadvertent loosening of the locking ring.

The liner may be suspended from the lid by the neck when empty. As the liner is filled (and for some time thereafter), the liner expands into contact with the bottom wall of the container.

These and other features of the application can be best understood from the following specification and drawings, the following of which is a brief description.

DETAILED DESCRIPTION OF THE PREFERRED EMBODIMENTS

Figure 1:
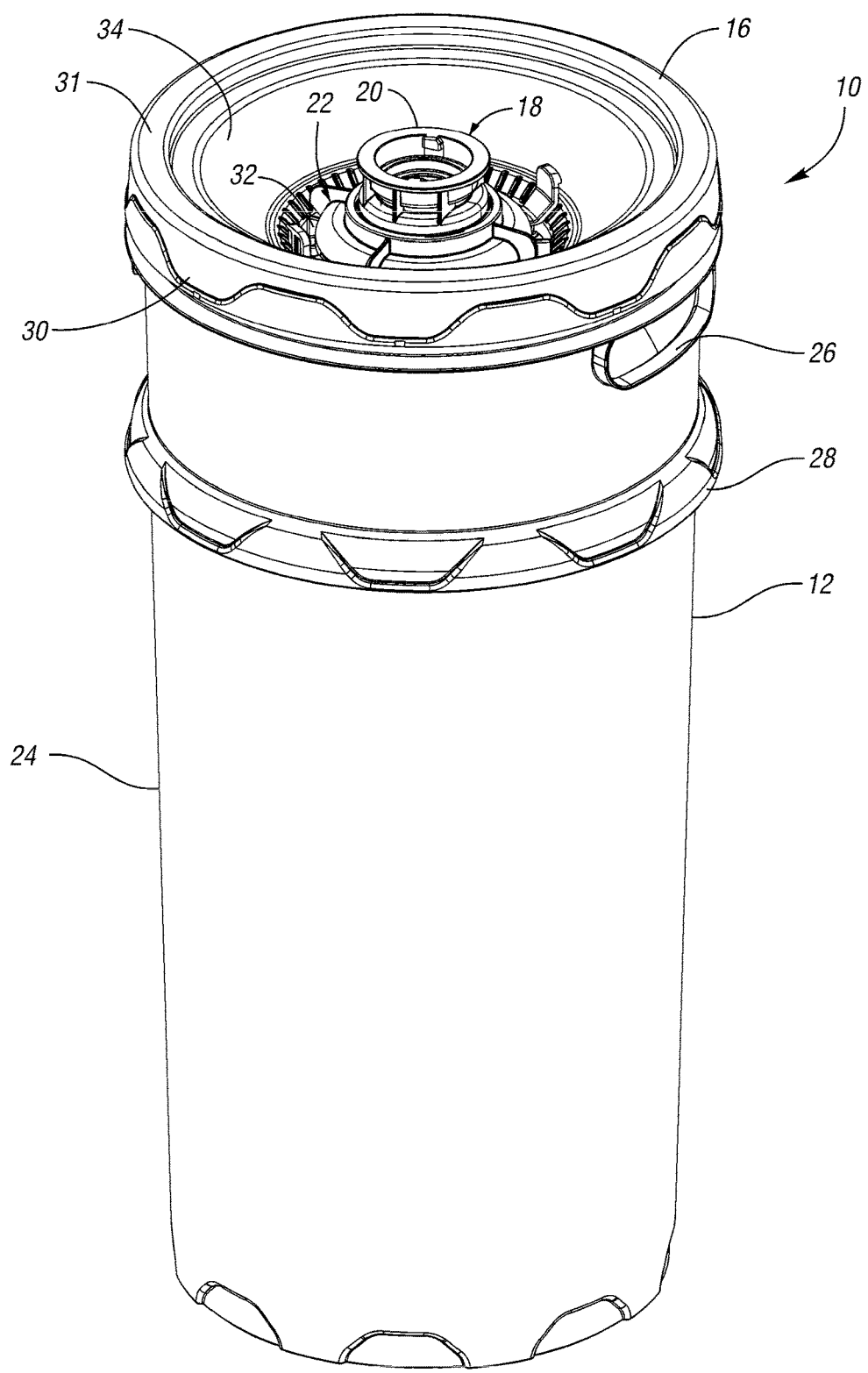
FIG. 1 is a perspective view of a plastic keg according to a first embodiment of the present invention.

FIG. 1 shows a plastic beer keg 10 according to a first embodiment of the present invention. The plastic beer keg 10 generally includes an outer container 12 surrounding an inner liner 14 (FIG. 2), such as a PET bottle. A lid 16 is secured over an open end of the outer container 12 to retain the liner 14 within the interior of the outer container 12. A valve assembly 18 is retained in the mouth of the liner 14 by a retainer 20, which protrudes through an opening in the lid 16. A fastener, in this case a locking ring 22, is secured to the retainer 20 to secure the retainer 20 to the lid 16. In this example, the locking ring 22 is threaded to the retainer 20 to prevent the retainer 20 from being removed downwardly through the opening in the lid 16.

The outer container 12 includes a tapered cylindrical outer wall 24 having an upper end to which the lid 16 is snap-fit or threaded. A pair of handle openings 26 (one shown) are formed through the outer wall 24. A skirt 28 may extend around the periphery of the wall 24 to provide ease of handling.

The lid 16 includes a lip 30 extending downward from a generally horizontal, annular rim portion 31 extending about the periphery of the lid 16 and over the upper edge of the outer wall 24 of the outer container 12. The lid 16 further includes a lower annular wall 32 spaced below the upper edge of the outer container 12 and connected by a frusto-conical wall 34 to the outer periphery of the lid 16.

Figure 2:
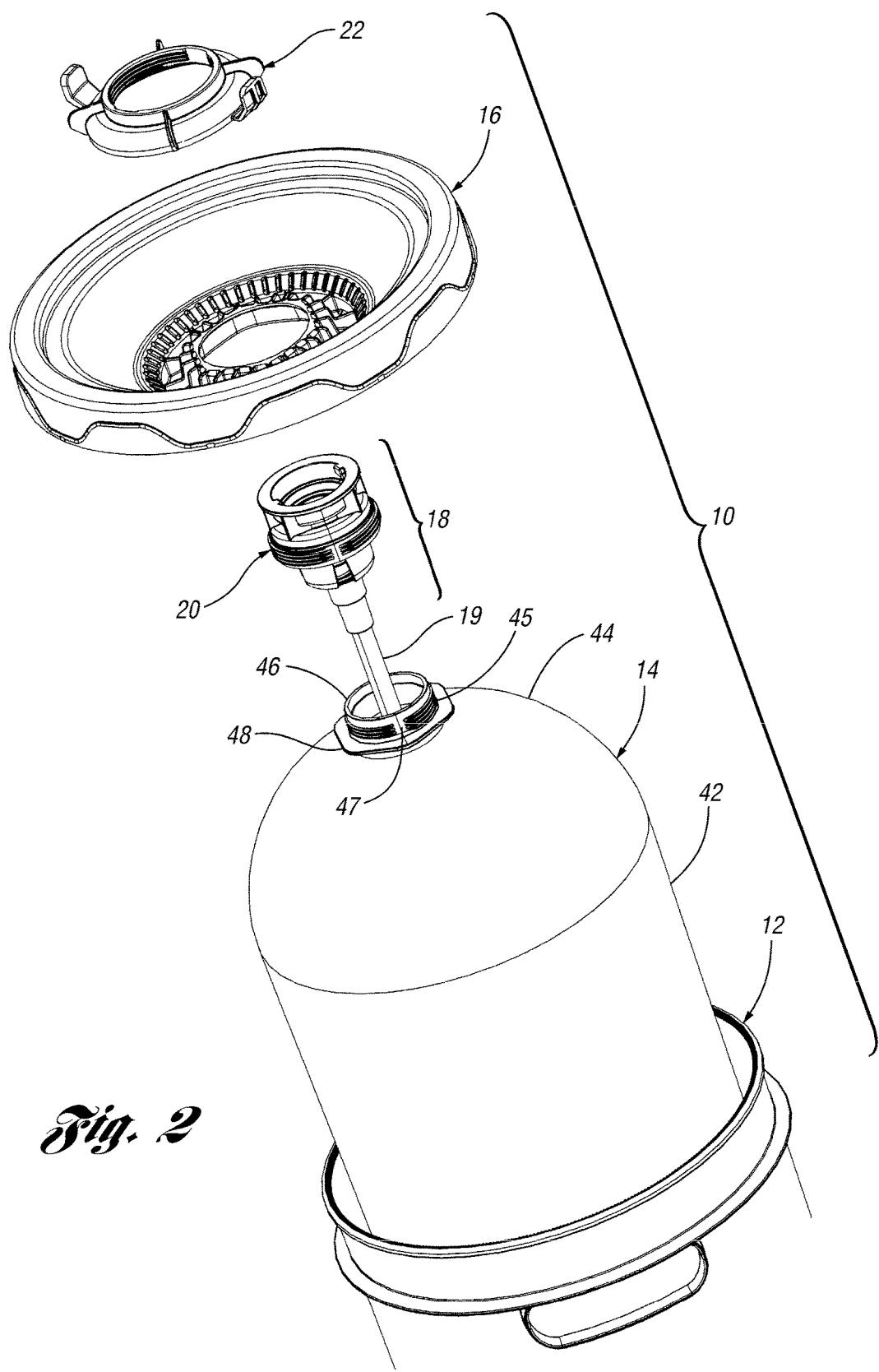
FIG. 2 is an exploded view of an upper portion of the keg of FIG. 1.
Figure 3:
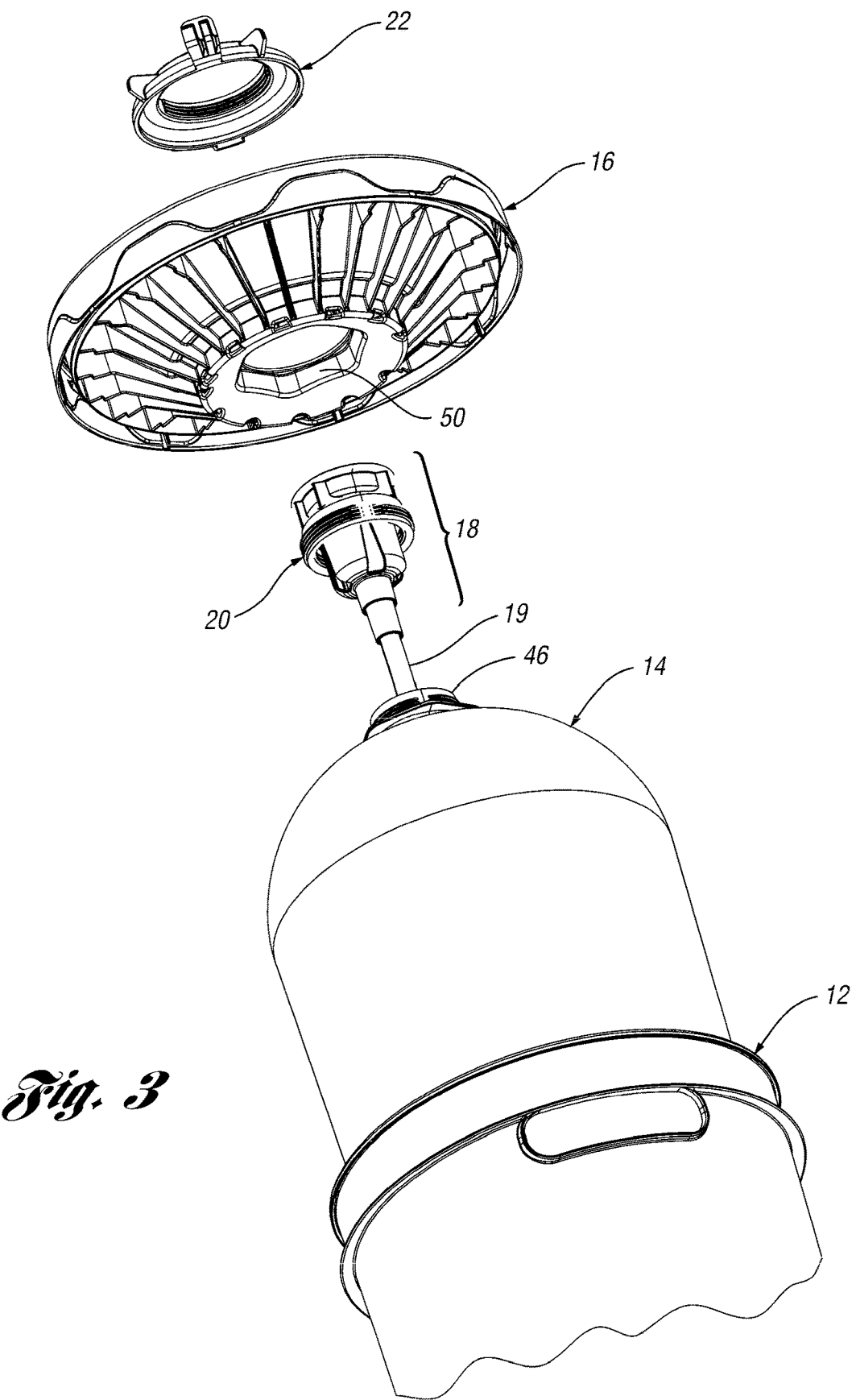
FIG. 3 is a bottom view of the upper portion of the keg of FIG. 2.

FIGS. 2 and 3 are exploded views of the plastic beer keg 10 of FIG. 1. The liner 14 is a PET bottle or other suitable material having tapered cylindrical side walls 42 and an upper hemispherical spherical portion 44 (or generally spherically, i.e. some portion of a sphere, or close to it, even if not completely half) transitioning to a neck 46, which as shown, may be threaded. A hexagonal (or other non-circular shape) neck ring 48 is integrally molded around the neck 46. The neck 46 includes external threads 45 having a vertical gap 47 to permit the controlled release of pressure in the liner 14.

The retainer 20 is securable to the neck 46 of the liner 14 (such as by threading) in order to retain the valve assembly 18 within the neck 46. A semi-flexible tube 19 extends downward from the valve assembly 18 into the liner 14. The outer container 12, the lid 16, and the retainer 20 may each be separately molded of HDPE, polypropylene or other suitable materials. The lid 16 includes an opening 50 complementary in shape (in this case, hexagonal) to the neck ring 48.

Figure 4:
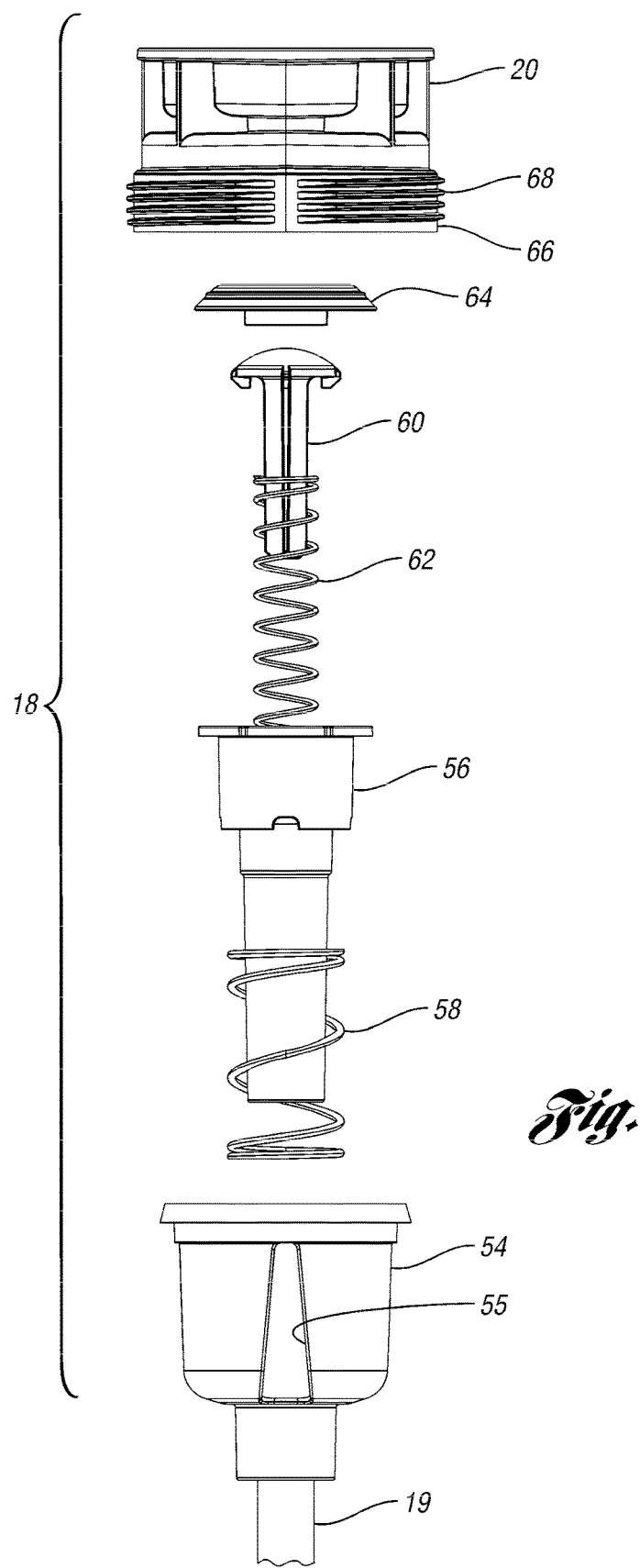
FIG. 4 is an exploded view of the valve assembly of FIG. 1.
Figure 5:
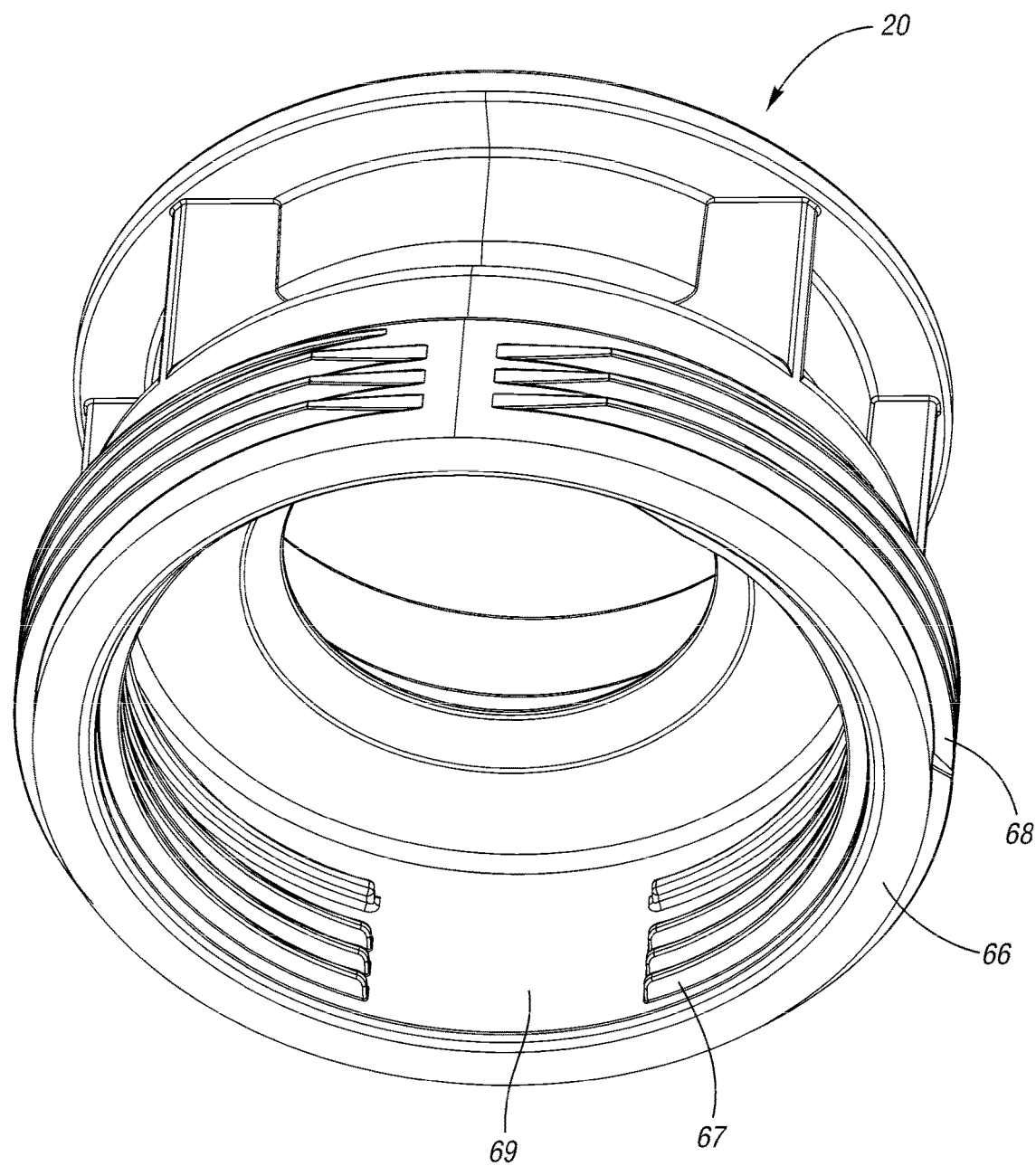
FIG. 5 is a bottom perspective view of the retainer of FIG. 1.

An exploded view of the valve assembly 18 is shown in FIG. 4. A cup 54 has a plurality of openings 55. A valve body 56 received in the cup 54 is connected to the tube 19 and biased away from the cup 54 by an outer spring 58. A port 60 is received in the valve body 56 and biased away from the valve body 56 by an inner spring 62 toward a piston 64. The piston 64 is biased toward the retainer 20, in which the rest of the components are at least partially received. The retainer 20 includes an annular wall 66 having external threads 68. As shown in FIG. 5, the retainer 20 also includes internal threads 67 having vertically aligned gaps 69 which, together with the gaps 47 in the threads 45 on the neck 46 of the liner 14 (FIG. 2), permit the controlled release of pressure in the liner 14.

The valve assembly 18 is pre-assembled, as shown in FIGS. 2 and 3, and can then be attached to the liner 14 prior to assembly to the container 12 and lid 16. In this way, the components that must be sanitized (the interior of the valve assembly 18 components and the interior of the liner 14) are sealed for shipping and storage, while the container 12 and lid 16 do not need to be sanitized.

Figure 6:
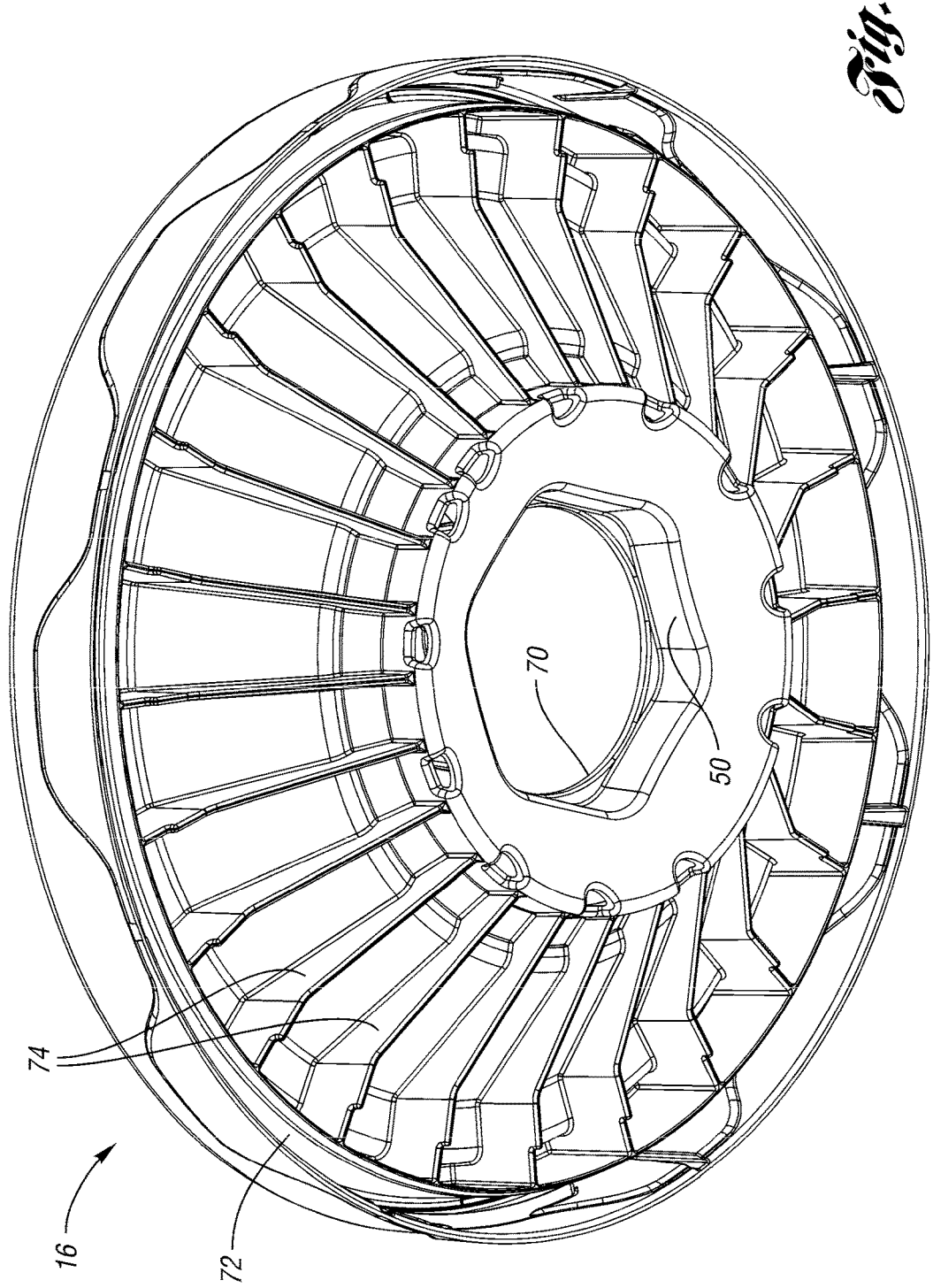
FIG. 6 is a bottom perspective view of the lid of FIG. 1.

FIG. 6 is a bottom perspective view of the lid 16. An annular flange 70 is formed at the top of the opening 50 through the lid 16. The lid 16 includes an inner rim 72 spaced inwardly from the lip 30. Reinforcing ribs 74 extend radially inward from the inner rim 72 on the underside of the lid 16.

Figure 7:
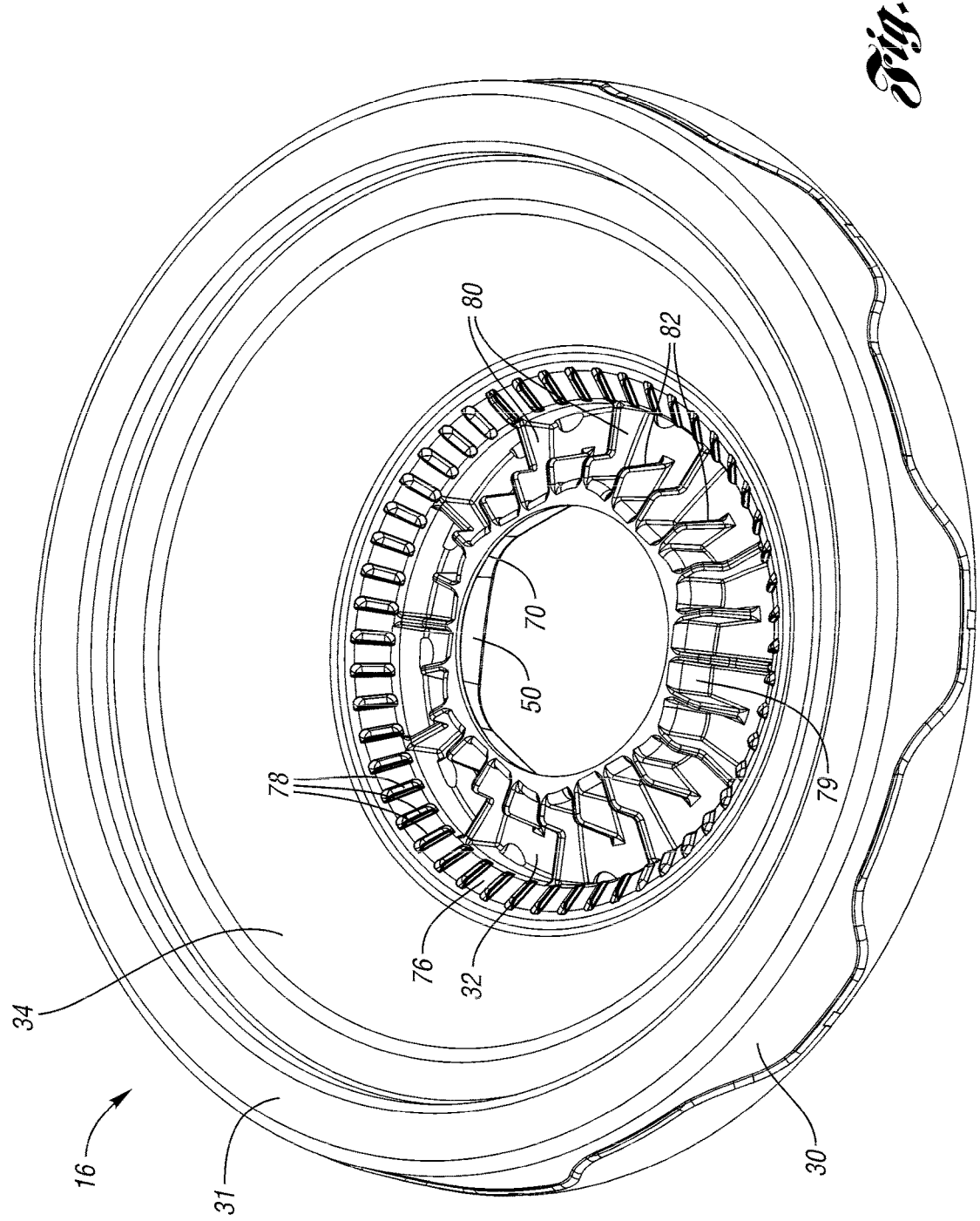
FIG. 7 is a top perspective view of the lid of FIG. 6.

FIG. 7 is a top perspective view of the lid 16. As indicated above, the lid 16 includes the annular rim portion 31 extending about the periphery of the lid 16, the lower annular wall 32 and a frustoconical wall 34. As can be seen in FIG. 7, the lid 16 further includes an inner frustoconical wall 76 extending downward more sharply from the frustoconical wall 34 to the lower annular wall 32. Ratchet teeth 78 are formed on the inner frustoconical wall 76. The lower annular wall 32 together with a peripheral rib 79 define the opening 50 (again, in this example, hexagonal) through the lid 16. The annular flange 70 extends inwardly from an upper edge of the peripheral rib 79. Reinforcing ribs 80, 82 extend radially outward from the peripheral rib 79 along the lower annular wall 32.

Figure 8:
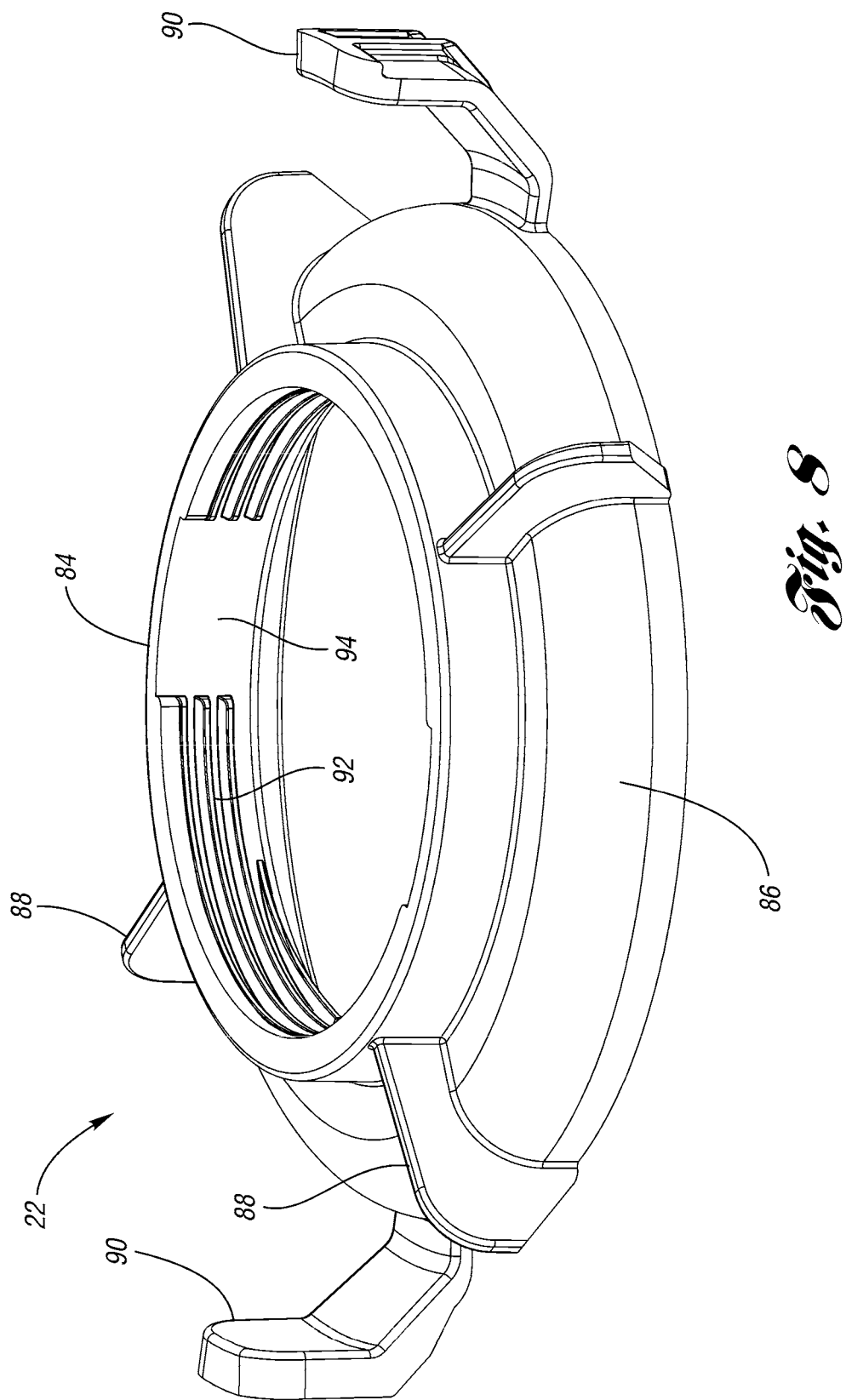
FIG. 8 is a top perspective view of the locking ring of FIG. 1.

FIG. 8 is a perspective view of the locking ring 22. The locking ring 22 includes a generally vertical annular wall 84 having interior threads 92 having vertically aligned gaps 94. An outer annular portion 86 curves outward and downward from a lower edge of the annular wall 84. Radially extending ribs 88 facilitate rotating the locking ring 22 by hand or with automated equipment. Locking ring tabs 90 protrude radially outwardly from the outer annular portion 86. The locking ring tabs 90 are configured so that they can be bent back or broken for disassembly after use.

Figure 9:
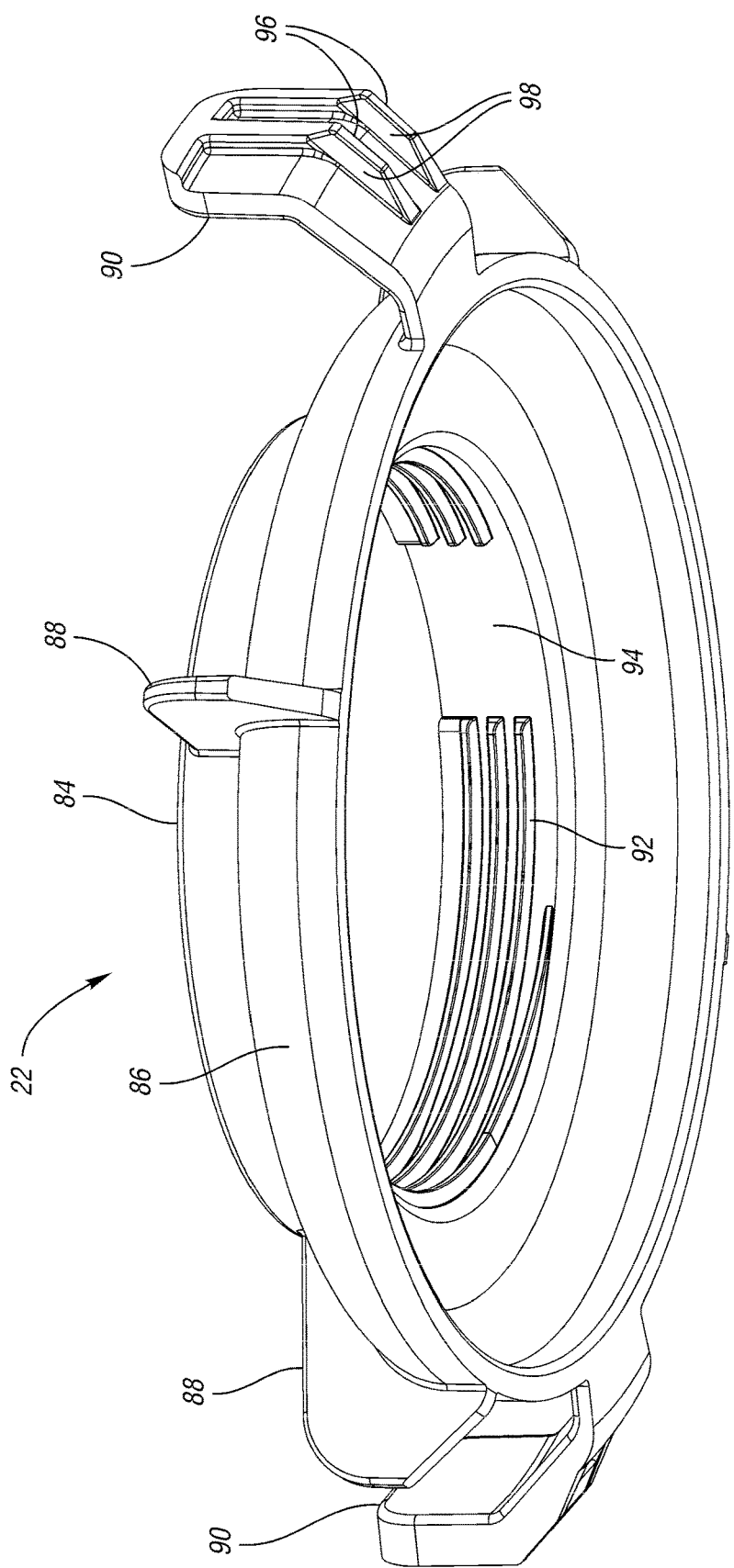
FIG. 9 is a bottom perspective view of the locking ring of FIG. 8.
Figure 10:
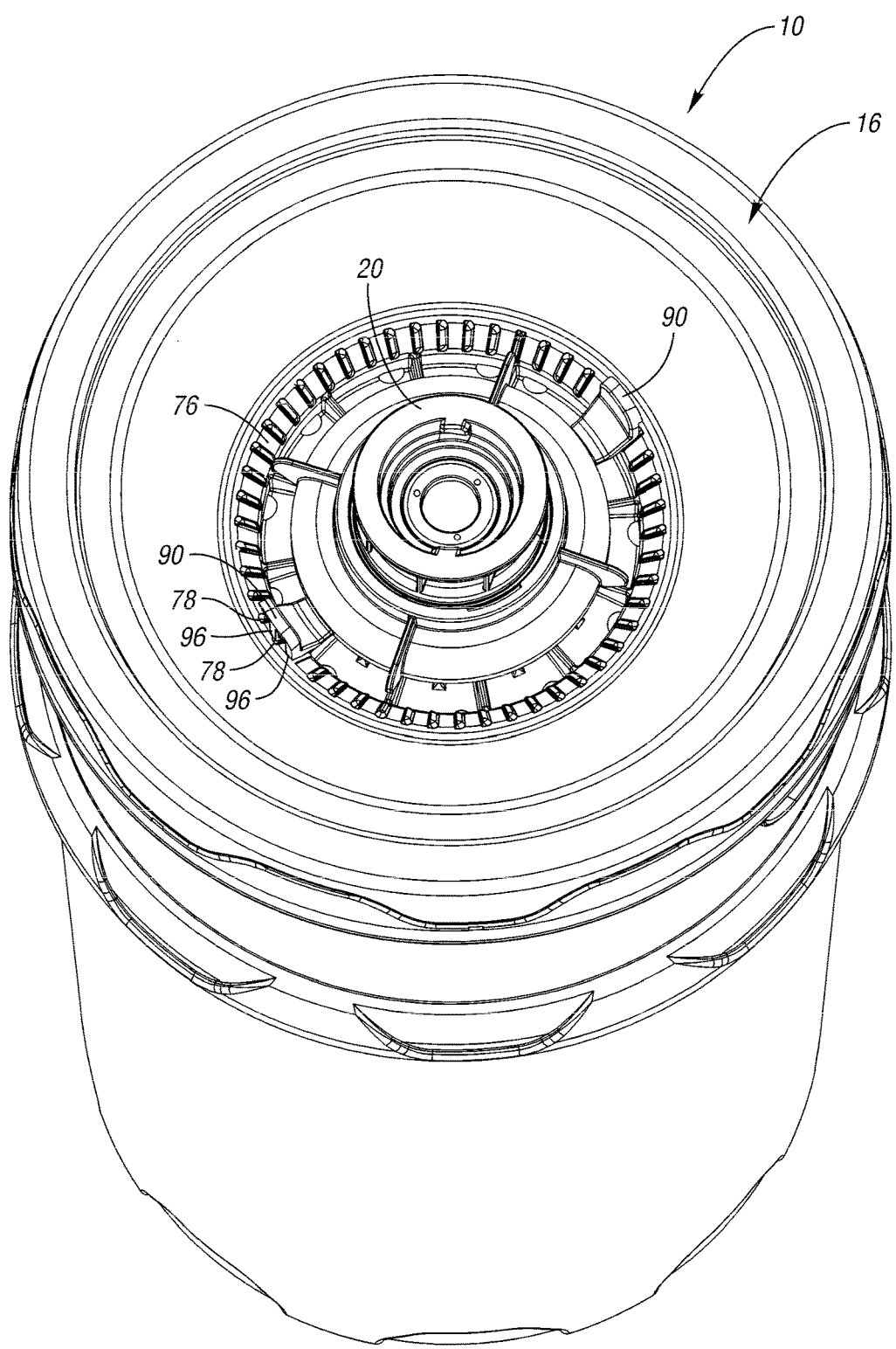
FIG. 10 is an enlarged top perspective view of the keg of FIG. 1.

Referring to FIG. 9, ratcheting teeth 96 are formed on the outer ends of the locking ring tabs 90. The ratcheting teeth 96 each include a tapered surface 98 to provide the ratcheting function against the ratchet teeth 78 on the inner frustoconical wall 76 of the lid 16, as can be seen in FIG. 10. The ratcheting teeth 96 would permit the locking ring 22 to be rotated in a tightening direction (in this case, clockwise) and prevent rotation in a loosening direction (in this case, counterclockwise). After use, the locking ring tabs 90 can be bent back or broken for disassembly and recycling of the keg 10.

Figure 11:
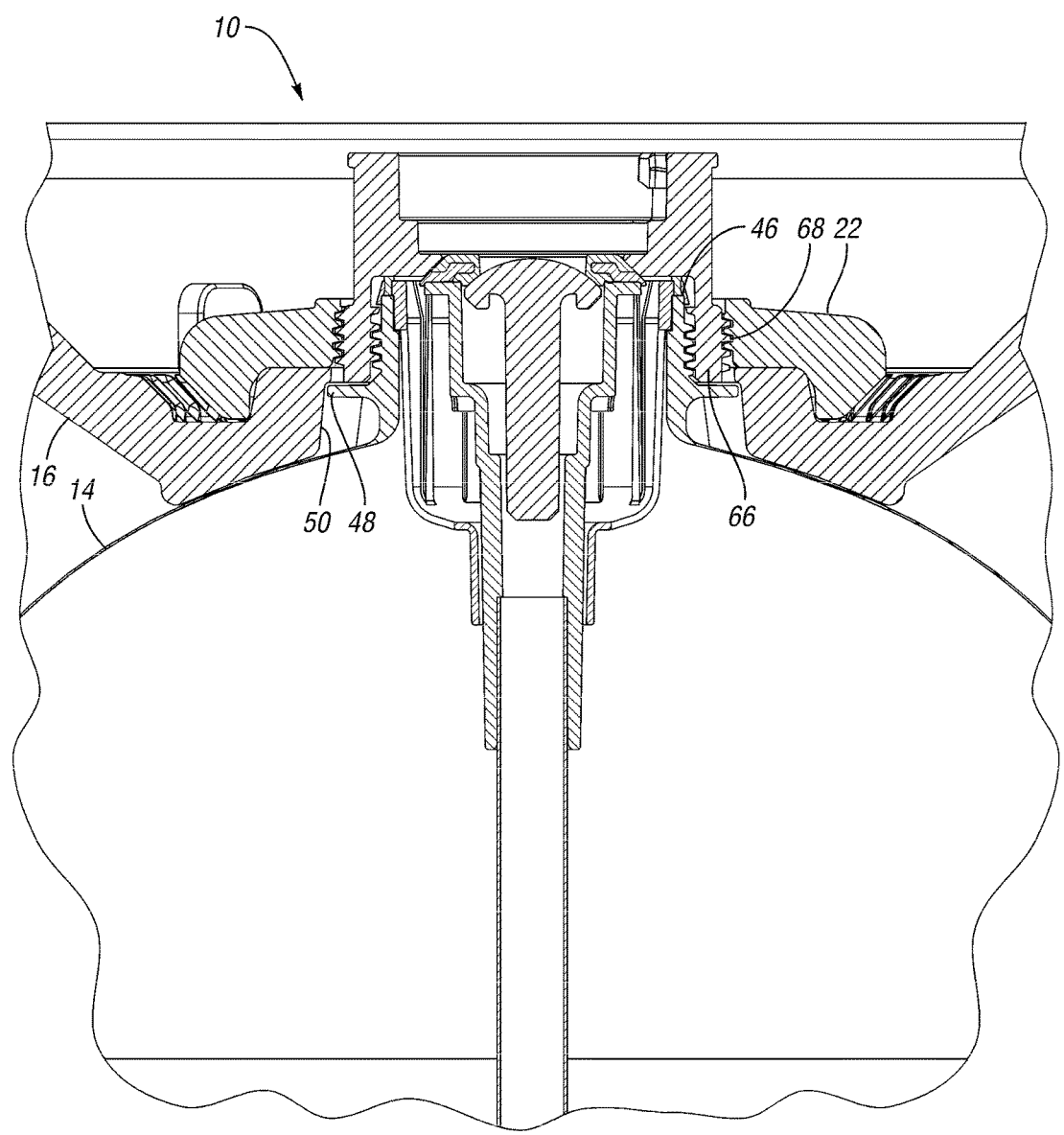
FIG. 11 is a section view of the upper portion of the keg of FIG. 1.

FIG. 11 is a section view of the neck 46 area of the liner 14. The retainer 20 is threaded to the neck 46 of the liner 14. The retainer 20 and neck 46 can be inserted into the opening 50 of the lid 16 and retained to the lid 16 by the locking ring 22. The neck ring 48 is received in the complementarily shaped opening 50 in the lid 16 to prevent relative rotation therebetween, such as during tapping. Further, small teeth on the lid 16 may interact with small teeth on the upper edge of the container 12 to prevent relative rotation therebetween.

Figure 12:
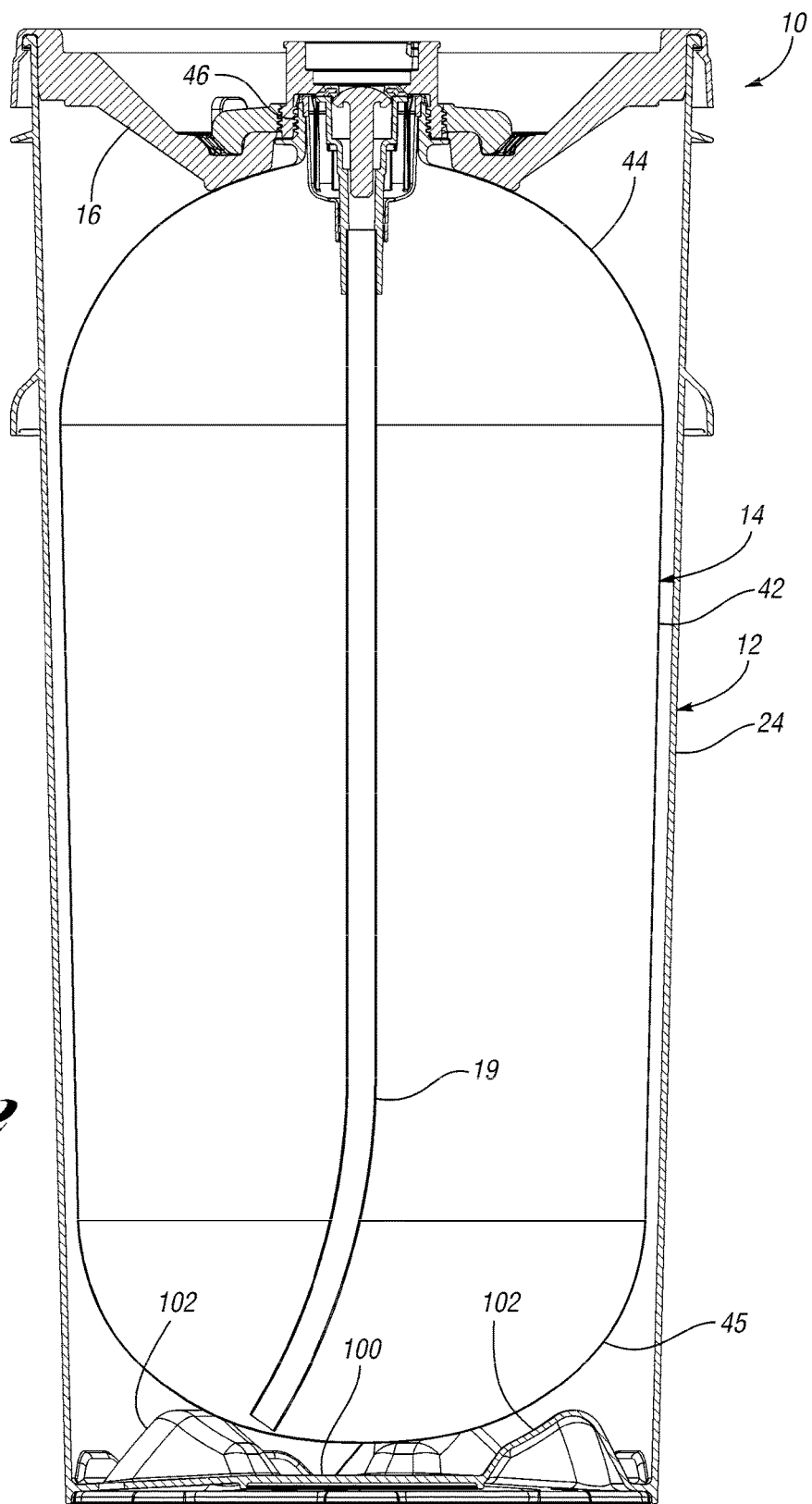
FIG. 12 is a section view of the keg of FIG. 1 prior to filling.

FIG. 12 is a section view of the keg 10 prior to filling. The liner 14 includes a hemispherical bottom portion 45 (or some portion nearly spherical). The side wall 42 of the liner 14 is tapered downwardly to match the taper of the outer wall 24 of the container 12, such that there is no contact between the side wall 42 of the liner 14 and the outer wall 24 of the container 12. The hemispherical bottom portion 45 does not prevent rotation of the liner 14 relative to the container 12, but resists creep well and makes it easier to retrieve the last remaining amounts of liquid in the liner 14. If the hemispherical bottom portion 45 is used, the bottom wall 100 of the container 12 can include feet 102 to support the liner 14. The bottom wall 100 is convex upward.

Figure 13:
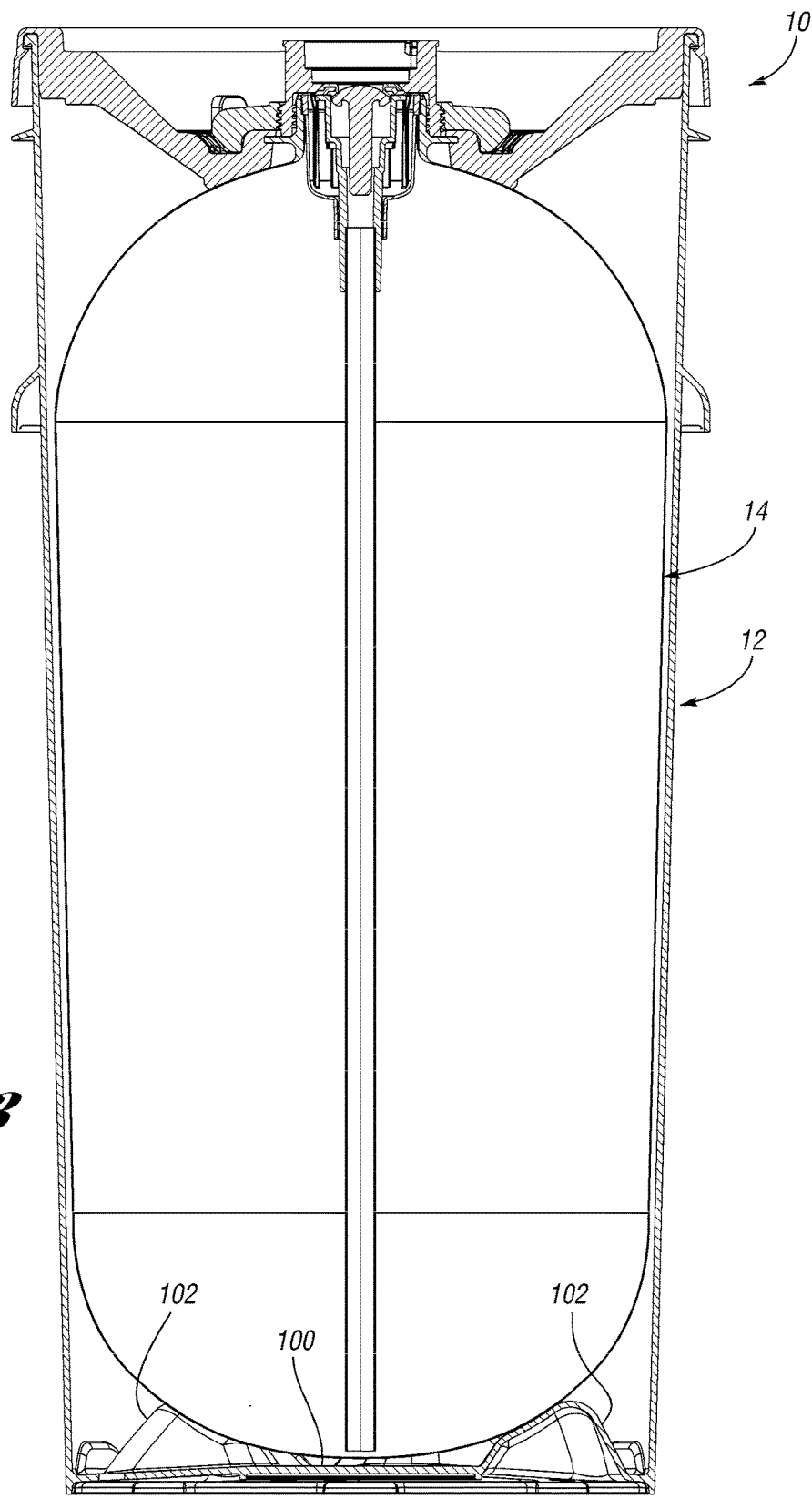
FIG. 13 is a section view of the keg of FIG. 12 after filling.

As shown in FIG. 12, prior to filling, the liner 14 is suspended from the lid 16 within the container 12 by the neck 46. As shown in FIG. 13, the liner 14 will grow in height after being filled such that the bottom of the liner 14 will contact the feet 102 at the bottom 100 of the container 12. The convex bottom wall 100 may be deflected downward by the expansion of the liner 14. The filled liner 14 is in an interference fit vertically between the lid 16 and the feet 102 of the bottom wall 100. The tube 19 should be semi-flexible and long enough to account for the growth in liner 14 height after filling.

If the keg 10 is used in automated filling equipment, the compressive forces on the retainer 20 will be transferred by the locking ring 22 to the lid 16 directly to the container 12. There are little or no compressive forces transferred through the liner 14, especially prior to filling. The container 12 is much stronger than the liner 14 and can easily withstand the compressive forces of the automated equipment. After filling, when the liner 14 is pressurized, the liner 14 is also able to withstand compressive forces, if necessary.

Figure 14:
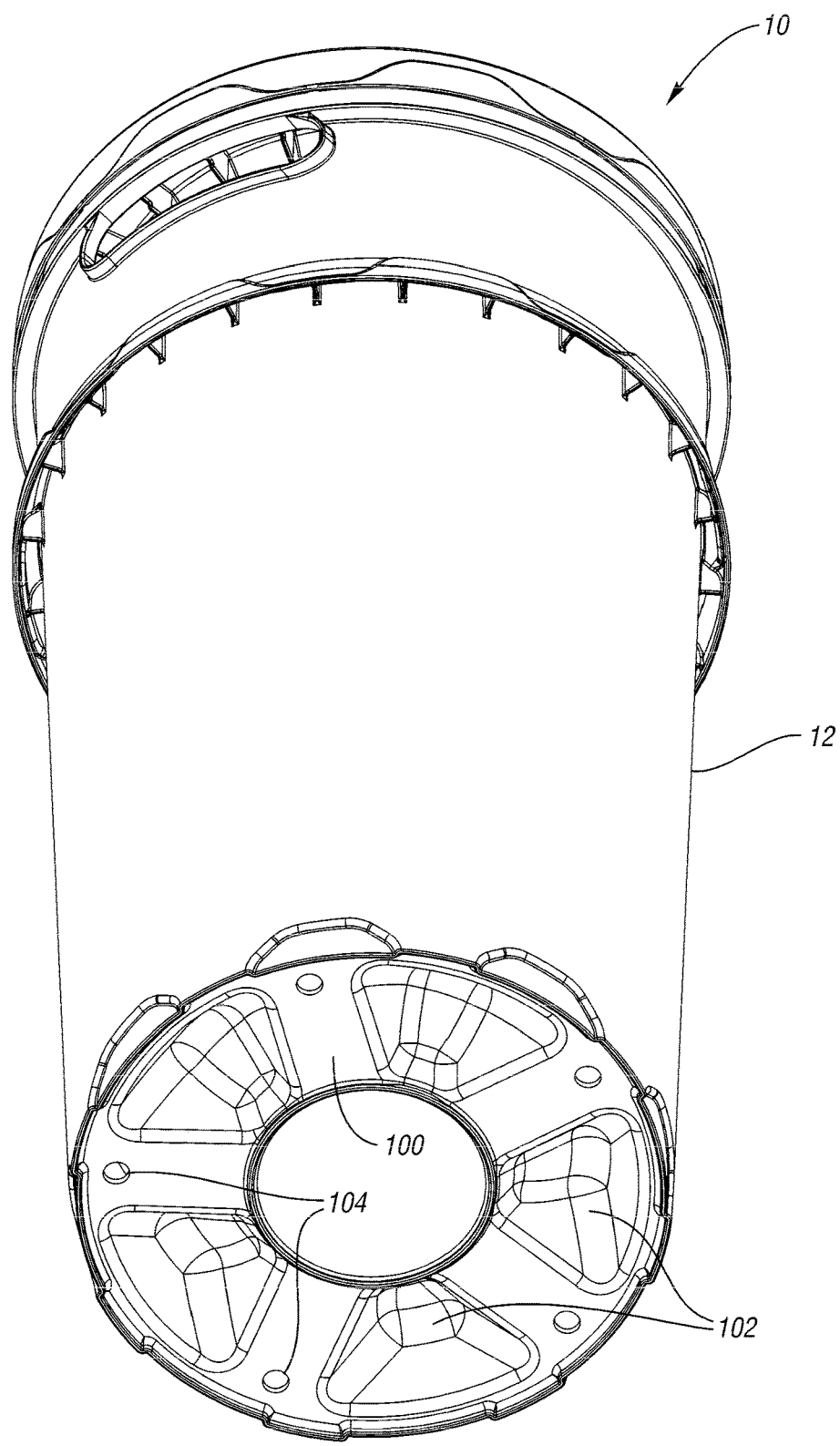
FIG. 14 is a bottom perspective view of the container of FIG. 1.
Figure 15:
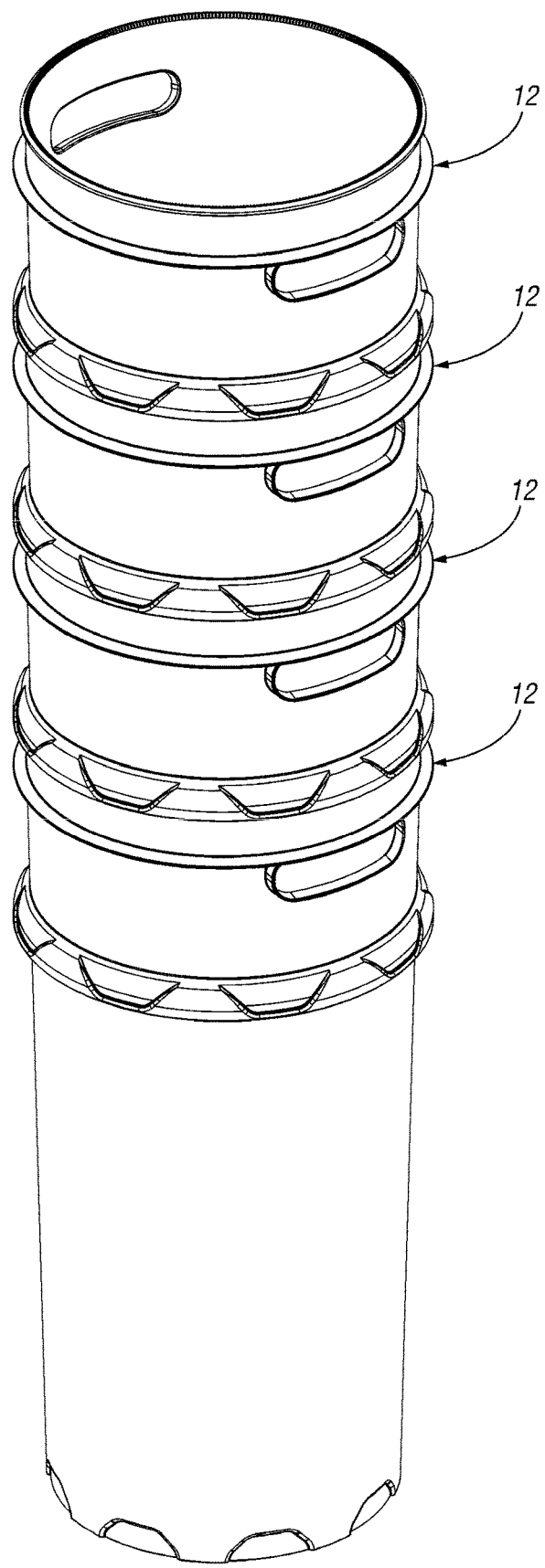
FIG. 15 is a perspective view of the container of FIG. 14 nested with a plurality of identical containers.

FIG. 14 is a bottom perspective view of the container 12. As shown, the bottom wall 100 of the container 12 includes the feet 102 and a plurality of optional drain holes 104. The tapered container 12 can nest in similar containers 12 when empty to save space during shipping and storage, as shown in FIG. 15.

Figure 16:
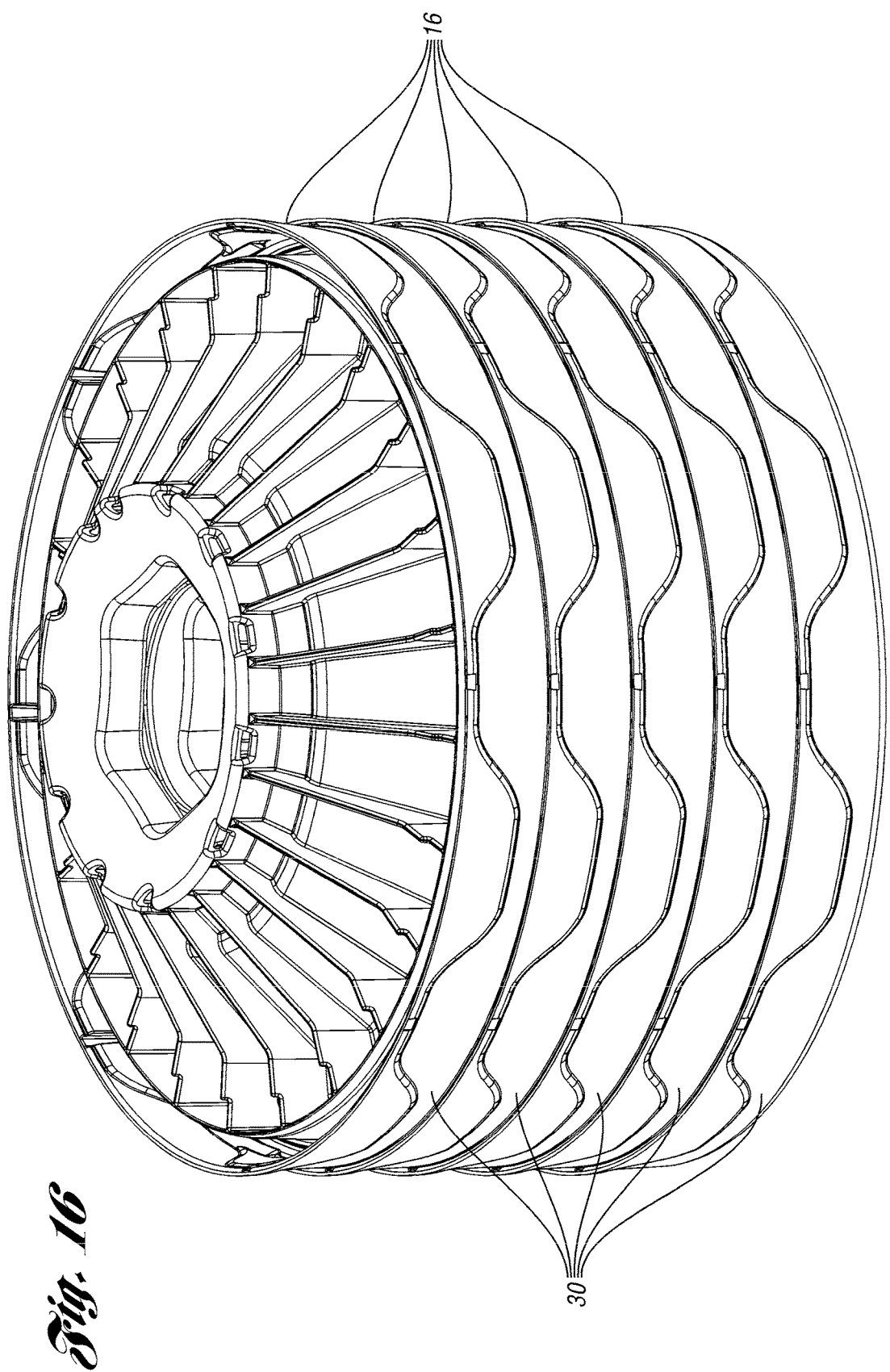
FIG. 16 is a perspective view of the lid of FIG. 7 nested with a plurality of identical lids.

As shown in FIG. 16, the lids 16 can also be nested with one another to reduce storage and shipping space. The lips 30 of the lids 16 stack on one another.

Figure 17:
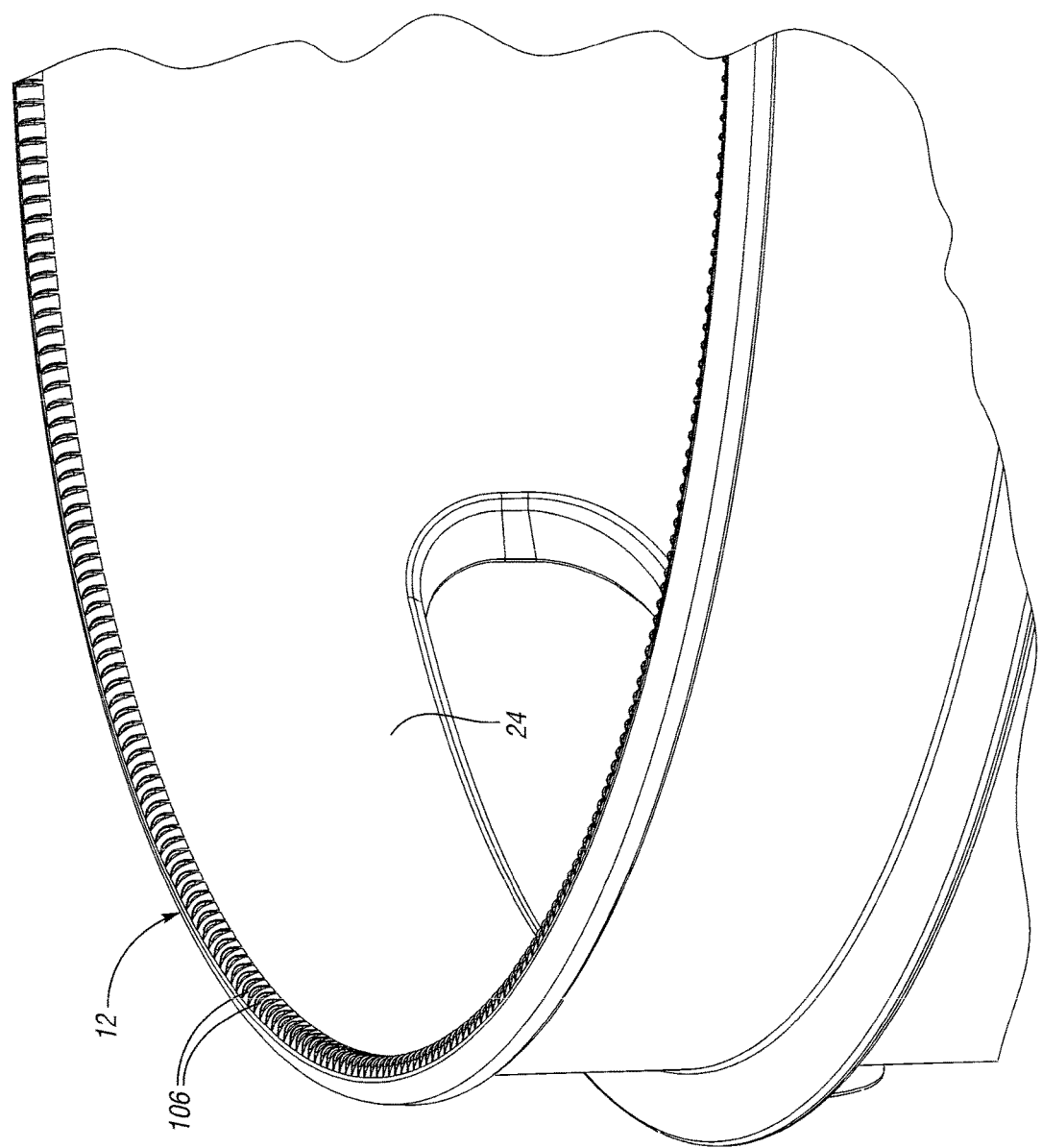
FIG. 17 is an enlarged perspective view of the upper edge of the container of FIG. 1, showing an optional feature.
Figure 18:
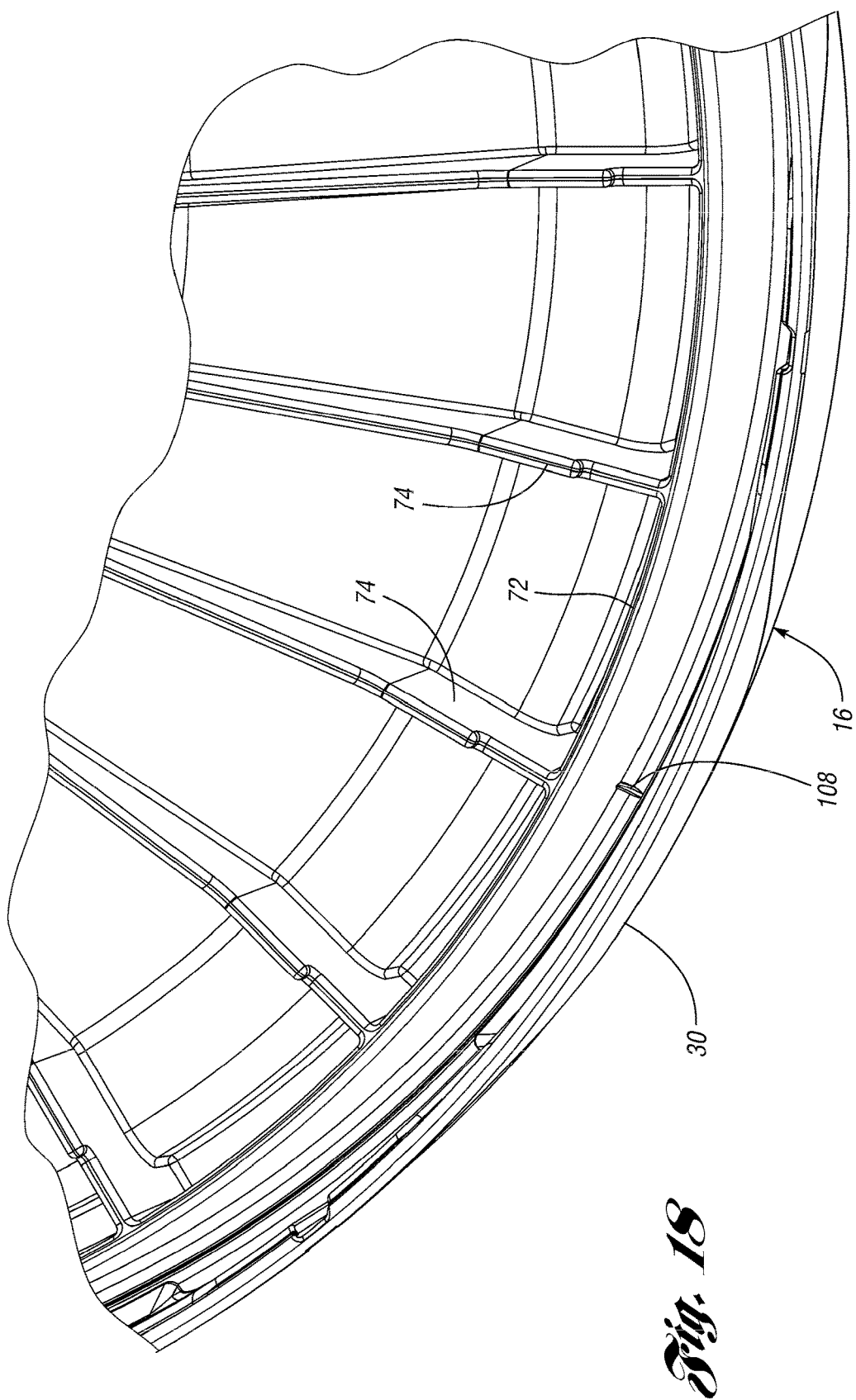
FIG. 18 is an enlarged perspective view of a portion of the underside of the lid of FIG. 1, showing an optional feature.

FIG. 17 is an enlarged view of the upper edge of the outer wall 24 of the container 12. Optionally, a plurality of teeth 106 are formed along the entire periphery of the upper inner edge of the outer wall 24. These teeth 106 engage a plurality of ribs 108 formed on the underside of the lid 16 as shown in FIG. 18. The ribs 108 (one shown) are preferably formed between the lip 30 and the inner annular rim 72. The ribs 108 may connect the inner annular rim 72 to the annular rim portion 31 of the lid 16. The ribs 108 engage the teeth 108 (FIG. 17) when the lid 16 is secured to the container 12. This engagement prevents relative rotation between the lid 16 and container 12. The ribs 108 may be spaced by about 30-60 degrees about the periphery of the lid 16.

The outer container 12, the lid 16, the retainer 20 and locking ring 22 may each be separately formed (such as by injection molding) of HDPE, polypropylene or other suitable materials. The valve assembly 18 components can all be made of PET or polyethylene (such as by injection molding), other than the springs 58, 62, which could be stainless steel, PET, or polyethylene. The tube 19 may also be formed of PET or polyethylene.

In an alternative embodiment, the outer container 12 could also be formed of PET. Because the outer container 12 does not contact the beverage, the outer container 12 could be recycled PET from recycled liners 14 (and/or recycled valve assembly 18 components, tube 19, outer containers 12, etc). Optionally, the lid 16, retainer 20, and locking ring 22 could all also be formed of recycled PET, which could also be recycled. In this manner, the material from all of the keg 10 components can always be recycled and used again in creating more kegs 10.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. For example, although some of the inventive features described herein provide the ability to fill the keg in an inverted orientation in existing filling equipment with high clamping forces, it is also anticipated that the kegs would be desirable for use with upright filling, both automated and manually.

What is claimed is:

1. A plastic beer keg including:
   a container having an outer wall at least partially defining a container interior;
   a lid secured to an upper portion of the outer wall of the container;
   a liner within the container interior, wherein the liner is a bottle including a neck portion, a body portion and a bottom portion, wherein the only opening to an interior of the bottle is through the neck portion, wherein the liner interlocks with the lid to prevent relative rotation therebetween; and
   a valve mounted in the neck portion.

2. The plastic beer keg of claim 1 wherein the lid includes an opening through which a portion of the neck portion projects and wherein the neck portion includes a neck ring having a shape that interlocks with the opening to prevent relative rotation therebetween.

3. The plastic beer keg of claim 2 wherein the neck ring is a hexagon.

4. The plastic beer keg of claim 2 wherein the valve includes a spring.

5. The plastic beer keg of claim 4 wherein the liner is a PET bottle, the PET bottle including a shoulder portion between the body portion and the neck portion.

6. The plastic beer keg of claim 2 wherein an upper portion of the outer wall includes interlocking features and the lid includes complementary interlocking features to prevent relative rotation therebetween.

7. A plastic lid comprising:
   an annular rim portion;
   a lip projecting downwardly from the rim portion;
   a lower annular wall portion having an opening therethrough, the lower annular wall portion spaced downwardly from the rim portion;
   a frustoconical wall portion connecting the lower annular wall portion to the rim portion;
   an inner frustoconical wall portion between the frustoconical wall portion and the lower annular wall portion; and
   a plurality of ratchet teeth disposed about the opening, wherein the ratchet teeth are formed on the inner frustoconical wall portion.

8. A locking ring comprising:
   a generally cylindrical portion for receiving therein a neck of a liner, the generally cylindrical portion having internal threads;
   a lower annular flange portion extending radially outward from a lower portion of the cylindrical portion; and
   at least one tab projecting outwardly from the lower annular flange, the at least one tab including at least one ratcheting tooth.

9. The locking ring of claim 8 further including radially extending ribs projecting upward from the annular flange to facilitate rotation of the locking ring.

* * * * *